United States Patent

[11] 3,633,807

[72] Inventor David Williams
Redwood City, Calif.
[21] Appl. No. 24,647
[22] Filed Apr. 1, 1970
[45] Patented Jan. 11, 1972
[73] Assignee Ampex Corporation
Redwood City, Calif.

[54] MAGNETIC TAPE BIN
5 Claims, 2 Drawing Figs.

[52] U.S. Cl. .......... 226/97, 226/118
[51] Int. Cl. .......... G11b 15/58
[50] Field of Search .......... 226/97, 7, 118, 119; 242/182, 183, 184, 185

[56] References Cited

UNITED STATES PATENTS

| | | | |
|---|---|---|---|
| 3,112,473 | 11/1963 | Wicklund et al. | 242/185 X |
| 3,284,013 | 11/1966 | Naiman et al. | 242/184 |
| 3,209,974 | 10/1965 | Nye | 226/118 |
| 3,465,938 | 9/1969 | McCammon | 226/97 X |

*Primary Examiner*—Allen N. Knowles
*Attorney*—Robert G. Clay

ABSTRACT: In a tape duplicating machine the master tape is arranged in endless loop form and is stored in a bin having a large number of tape loop vacuum storage columns. The front and back walls of the columns confronting the tape loop edges, are inclined to diverge outwardly from top to bottom so that, with equal airflows drawn by a vacuum source through restricted orifices at the bottom of the columns, the loops all seek similar intermediate lengths in the columns. The columns are coupled through a common manifold to a single vacuum source, and a flow control valve is placed between the source and manifold to regulate the lengths of the loops and the amount of tape stored in the bin.

INVENTOR
DAVID WILLIAMS
BY Robert S. Clay
ATTORNEY

MAGNETIC TAPE BIN

BACKGROUND OF THE INVENTION

This invention relates to magnetic tape transports, and particularly to tape storage bins therefor.

In copending U.S. Pat. application Ser. No. 24,761 entitled "Magnetic Tape Duplicator" by Alfred F. Stahler, filed Apr. 1, 1970, there is disclosed an arrangement for contact duplicating transfer of the signal of a master tape to a copy tape as by passing the superimposed tapes through a transfer excitation field. The tapes may both be mounted on reels, but for making repeated copies of a short master tape, only the copy tape is reel mounted and the master tape is formed as an endless loop and is stored in a multiple loop bin. The present invention is concerned with the improved features of such a bin, in which the tape loops are preferably all of the same length, and of a suitable intermediate length, and of length that is variable at the will of the operator, or of a servocontrol means, to decrease or increase the amount of tape stored in the bin.

Accordingly, it is an object of the present invention to provide a tape storage bin that can be quickly regulated to set or change the amount of tape stored in the bin.

It is another object of the invention to provide a multiple tape loop vacuum column storage bin in which the loops all seek a predetermined intermediate length.

SUMMARY OF THE INVENTION

In a tape duplicating machine the master tape is arranged in endless loop form and is stored in a bin having a large number of tape loop vacuum storage columns. The front and backwalls of the columns confronting the tape loop edges, are inclined to diverge outwardly from top to bottom so that, with equal air flows drawn by a vacuum source through restricted orifices at the bottom of the columns, the loops all seek similar intermediate lengths in the columns. The columns are coupled through a common manifold to a single vacuum source, and a flow control valve is placed between the source and manifold to regulate the lengths of the loops and the amount of tape stored in the bin.

DETAILED DESCRIPTION

Figures 1, 2:
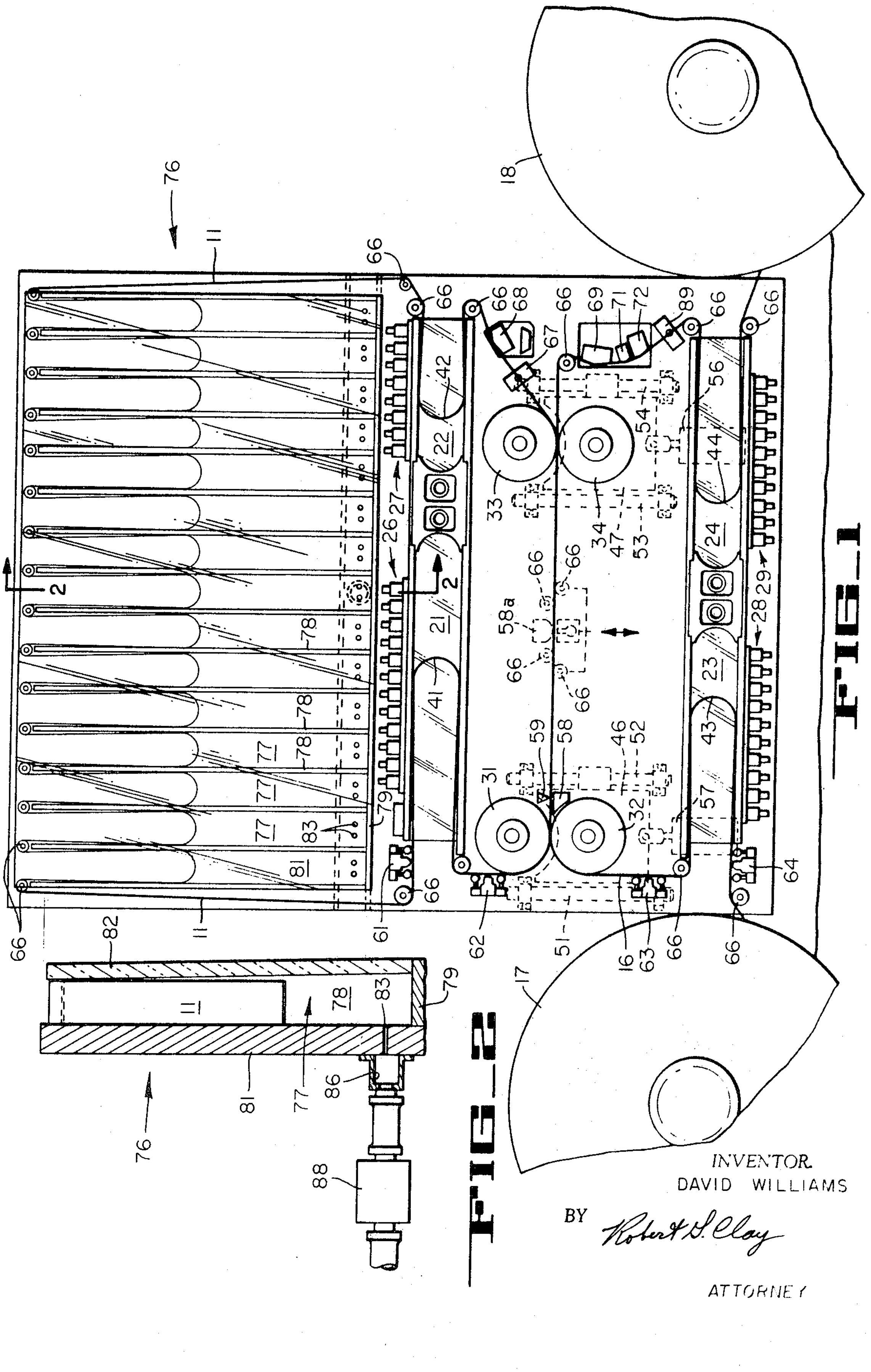
FIG. 1 is a broken away elevation view of a magnetic tape duplicating machine including the bin of the invention.
FIG. 2 is a cross-sectional view taken on the plane of lines 2—2 of FIG. 1.

As shown in FIGS. 1 and 2, the duplicating apparatus in which the invention has been used in practice includes a master tape 11, a copy tape 16, copy supply reel 17, copy takeup reel 18, two pairs of first tape loop vacuum columns 21, 22, 23 and 24 with respective loop length sensing means 26, 27, 28 and 29 provided between the respective reels and a first pair 31, 32 and second pair 33, 34 of pinch rollers. Means (not shown) are provided to receive signals from the loop length sensing means and to control the associated reels and the master tape to maintain the lengths of the tape loops 41, 42, 43 and 44 at a predetermined intermediate length and at a predetermined tension, as set by the value of the differential pressure established in the columns 21–24. The pinch rollers 32 and 34 are each mounted on a plate 46, 47 sliding on rails 51, 52, 53 and 54 for retraction of the rollers during threading and rewind modes to prevent undesired printing of the tape. The plates 46, 47 are retracted and urged into pinching position by means of air pressure cylinders 56, 57.

Also mounted on the plate 46, confronting the back of the copy tape, is a means 58 for applying transfer excitation to the superimposed tapes. Such excitation may take any of a number of known forms, e.g., alternating magnetic fields, radiofrequency excitation, high-frequency sound excitation, or heat or other stress excitation. The preferred means 58 used with success in the present invention is a transducing head producing magnetic fields of rapidly reversing polarity, which appear to the tape to decrease in strength as the tape moves away from the means 58 toward the rollers 33, 34. An air jet means 59 may be provided opposite the means 58. Alternatively, a head **58*a* and jet means 59*a* may be provided in the middle of the run between the rollers 31, 32 and the rollers 33, 34. Improved results have been obtained, however, with the head 58 as close as possible to the point of tangency between rollers 31, 32, due probably to the fact that the tapes, which are pressed by the rollers 31, 32 into adhesion contact, have less opportunity to slip shearingly with respect to one another because of tension differences, vibrations or other causes, at the zone of head 58 closest to the rollers 31, 32**.

To minimize the probability of shearing slippage, the tape path from rollers 31, 32 through the transfer field of head 58 is kept perfectly straight, although a path of unchanging curvature may also be used if convenient. The rollers 31, 32 are made of large diameter and the incoming tapes are give a full 90° angle of wrap upstream from the point of tangency, so that the tension in the tape causes squeezing of the air entirely from between the tape and rollers, preparatory to the action of the rollers in squeezing all the air from between the tapes in producing the previously described adhesion contact. Also, tape cleaners 61, 62, 63 and 64 are provided for both sides of both tapes at convenient points upstream from the rollers 31, 32. Air lubricated guides 66 are provided at convenient points on the tape path. A marker sensing means 67 and a playback head stack 68 for reading audio and cue tracks from television tape are provided downstream from roller 33 on the master tape path, while downstream from the roller 34 on the copy tape path are located a playback head 69 for reading the control track, an erase head 71 for erasing the control, audio and cue tracks, and a record head stack 72 for rerecording the control, audio and cue tracks from the playback signals produced in the heads 68 and 69. Such rerecording is usually needed in producing television tape copies because the long wavelength audio, control and cue signals cannot be contact printed to broadcast quality under the conditions that are needed for contact printing the video portion of the signal.

A record-rewind control means (not shown) is provided for controlling the operation of the pinch rollers, each of which is provided with a motor (not shown) and may be selectively operated as either an idler, a driving capstan, or a holdback drag roller. During the recording mode, the record-rewind control means operates a tape engaging and retraction control means (not shown) to cause rollers 31 and 32 to move upward into pinching position as shown, and operates roller 33 as a driving capstan and rollers 31, 32 as holdback tensioning rollers. Roller 34 operates as a pinch idler in this mode, and also as a tape speed tachometer, for it generates a signal representing its rotational speed.

During the rewind mode, the record-rewind control means operates the retraction control means to retract and withdraw rollers 32, 34 to prevent further printing, and operates rollers 31, 32 as driving captans and rollers 33, 34 as idlers.

Also shown in a multiple tape loop storage bin 76 for use with a master tape 11 in endless form, as shown in FIG. 1. As shown in FIGS. 1 and 2, the individual loop columns 77 are defined by sidewalls 78, bottom walls 79, a backwall 81, and a transparent front wall 82. The front wall 82 is slightly sloped outwardly from top to bottom so as to define the individual loop columns 77 as tapering divergingly from top to bottom, so that as the tape loop grows longer, more atmospheric air is permitted to leak around the tape edges into the lower or vacuum portion of the column. Since the column is coupled to vacuum through restricted orifices 83, this increasing leakage of air as the loop grows longer causes the vacuum pressure in the vacuum side of the loop to increase toward gauge pressure, with the result that the tensioning force in the column is decreased and the loop is restored to its desired and preselected medium length. An opposite result obtains when the loop grows too short.

For the purpose of servocontrolling the feeding of tape from the bin 76 to the storage column 21, the bin 76 is provided with a common vacuum manifold 86 for all of the columns thereof, and the manifold is coupled to a vacuum source 87 through a regulating valve 88. The signal from the loop length sensing means 26 is then applied to control the valve 88 so that the orifice defined by the valve is decreased when the loop in column 21 is shorter than its desired intermediate length. This permits pressure to build up toward gauge pressure on the vacuum side of the columns 77 and assists in quickly feeding more tape to column 21 to more quickly lengthen the loop therein and restore the loop to the desired intermediate length. An opposite effect obtains when the loop in column 21 grows too long.

For repeated copying of selected portions of a master tape, which portions are too long for the bin 76, sensing means 67 and 89 may be employed, as is more fully described in copending application Ser. No. 24,761 previously mentioned.

I claim:

1. A multiple vacuum column magnetic tape loop storage bin, comprising:

a plurality of individual loop columns each formed with a front wall, backwall, two sidewalls and a bottom wall; and vacuum source means coupled to to each of said columns near the bottom thereof for drawing equal flows of air therefrom;

the front and backwalls of each column being spaced apart at the top for a distance substantially equal to he width of said tape, and said tape being draped across the top of each sidewall to dispose a tape loop within each column;

the front and backwalls of each column being sloped with respect to one another so as to be divergingly spaced apart in a downward direction from said top, and so as to define with the edges of said tape loop a restricted passage for the flow of atmospheric air toward the bottom and toward said vacuum source means;

flow regulating means between said columns and vacuum source for altering the flow drawn by said source so as to cause said loops to seek a new length and thus alter the quantity of tape that is stored in said bin; and a separate tensioning vacuum column provided with loop length sensing means for controlling said flow regulating means;

whereby all of said loops may be held at a predetermined intermediate length as a function of the flow drawn by said vacuum source means, and said predetermined length may be varied to maintain a predetermined length of loop in said tensioning column.

2. A bin as described in claim 1, wherein:

said columns are defined by a common backwall, a common front wall, a common bottom wall, and a plurality of sidewall partitions equispaced between said front and back common walls and lying in planes normal to said front, back and bottom common walls.

3. A bin as described in claim 2, wherein:

said common backwall has at least one restricted orifice communicating with each column near the bottom thereof; and common manifold means are provided on said backwall communicating with said restricted orifices and with said vacuum source means.

4. A bin as described in claim 3, wherein:

a flow regulating valve is disposed between said common manifold and said vacuum source means for setting and altering the tape storage capacity of said bin.

5. A bin as described in claim 4, wherein:

an air lubricated guide post is mounted at the top of each sidewall partition for frictionlessly supporting said tape loops therein.

* * * * *